J. J. RIGBY.
SOLDER CARRYING CAN CAP.
APPLICATION FILED MAY 25, 1907.

908,140.

Patented Dec. 29, 1908.

WITNESSES
J Clyde Ripley
R. L. stilborn

INVENTOR
John J. Rigby
BY
Axel V Beeken
ATTORNEY

UNITED STATES PATENT OFFICE.

JOHN J. RIGBY, OF NEW YORK, N. Y.

SOLDER-CARRYING CAN-CAP.

No. 908,140.

Specification of Letters Patent.

Patented Dec. 29, 1908.

Application filed May 25, 1907. Serial No. 375,578.

*To all whom it may concern:*

Be it known that I, JOHN J. RIGBY, a citizen of the United States of America, and a resident of New York city, borough of Brooklyn, county of Kings, and State of New York, have invented certain new and useful Improvements in Solder-Carrying Can-Caps, of which the following is a specification.

The present invention relates to solder-carrying can caps, such as are used to close the filling hole of fruit and other cans. Caps of this character are provided with a body of solder on the lower edge of their dependent flange, and, after the cap is placed in position on the can, a soldering iron is applied thereby fusing the solder and sealing the cap to the can.

Heretofore it has been customary to provide the lower edge of the flange with a body of solder both on its exterior and interior, the result of which is that the cap cannot fit snugly against its adjacent shoulder on the can, and further, when the solder is fused, it will have a tendency to flow upward on the inside of the dependent flange and into the interior of the can.

The object of the present invention is to obviate this condition and to prevent the solder from flowing into the interior of the can.

To this end the invention embraces the features hereinafter set forth.

In the accompanying drawings, the invention is embodied in a concrete and preferred form, but changes of construction can of course be made without departing from the legitimate and intended scope of the invention.

Figure 3:
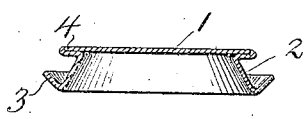
Figure 4:
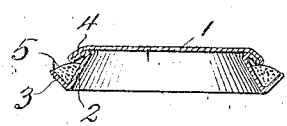
Figure 5:
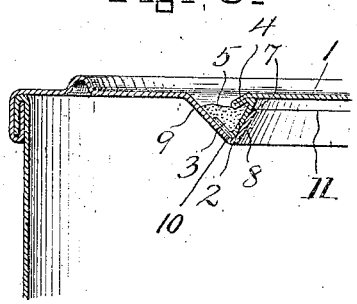

In the said drawings:—Figures 1, 2, 3 and 4 are vertical sectional views showing the development of the blank, embodying the invention. Fig. 5 is a vertical sectional view of a portion of the can with the cap in position.

Similar characters of reference indicate corresponding parts in the several views.

1 indicates a cap having the dependent flange 2 provided with the supporting shoulder 3 at its lower end on the exterior of the flange.

Figure 1:
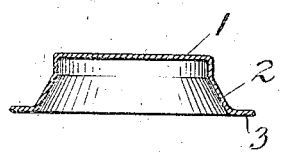
Figure 2:
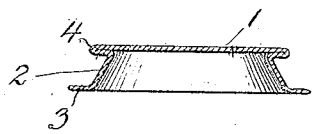

In Fig. 1 the blank is shown as it appears after being cut and drawn up. The blank is then subjected to the action of a suitable die which forms it with a bead 4 on the upper end of the flange and on the exterior thereof. This is shown in Fig. 2.

As shown in Fig. 3 the blank is now subjected to the action of a die which will turn up the supporting shoulder 3. A body of solder 5 is now placed on the supporting shoulder and the cap is again subjected to the action of a die which will flatten the bead 4 down over the solder so as to hold the same in position. This is shown in Fig. 4.

In Fig. 5 the cap is shown in position on the can in the groove 10 surrounding the aperture or filling hole 11. It will be noticed that the interior surface 7 of the dependent flange abuts against the inner wall 8 of the groove 10, and that the projecting supporting shoulder 3 abuts the outer wall 9. Since however, the shoulder 3 is of less depth than the wall 9, the solder when fused covers the shoulder 3 completely and forms an exterior seal between the dependent flange of the cap and the outer wall of the groove.

What is claimed is:—

1. The combination with a can having an aperture surrounded by a groove, of a solder-carrying can cap having a dependent flange and an upwardly extending shoulder, supporting a body of solder, both fitting into and abutting respectively against the inner and outer walls of the groove, the said supporting shoulder being of less depth than the abutting outer wall of the groove, whereby the solder, when fused, will cover the supporting shoulder and form an exterior seal between the outer wall of the groove and the dependent flange of the cap.

2. A can cap having a dependent flange, a projecting supporting shoulder at the lower end of said flange, a body of solder resting on the said supporting shoulder, and a bead on the cap for holding the solder on the supporting shoulder.

3. A can cap having a dependent flange, a projecting supporting shoulder at the lower end of said flange, a body of solder resting on said supporting shoulder, and a downwardly projecting bead extending from the upper end of the cap for holding the solder on the supporting shoulder.

4. A can cap having a dependent flange provided with a supporting shoulder at its lower end and a bead at its upper end on its exterior surface, and a body of solder confined between the supporting shoulder and bead.

5. A can cap having a dependent flange, an upwardly projecting supporting shoulder at the lower end of said flange, a body of solder resting on the said supporting shoulder, and a bead on the cap for holding the solder on the supporting shoulder.

6. A can cap having a dependent flange, an upwardly projecting supporting shoulder at the lower end of said flange, a body of solder resting on said supporting shoulder, and a downwardly projecting bead extending from the upper end of the cap for holding the solder on the supporting shoulder.

7. A can cap having a dependent flange provided with an upwardly projecting supporting shoulder at its lower end, and a bead at its upper end on its exterior surface, and a body of solder confined between the supporting shoulder and bead.

Signed at Brooklyn, N. Y. this 14th day of May 1907.

JOHN J. RIGBY.

Witnesses:
 FRED. H. McGAHIE,
 C. S. SNIFFEN.